US009557563B2

United States Patent
Suzuki et al.

(10) Patent No.: US 9,557,563 B2
(45) Date of Patent: Jan. 31, 2017

(54) OPTICAL SCANNING DEVICE, METHOD OF ADJUSTING OPTICAL SCANNING DEVICE, AND IMAGE FORMING APPARATUS

(71) Applicants: Mitsuo Suzuki, Kanagawa (JP); Kohji Sakai, Tokyo (JP)

(72) Inventors: Mitsuo Suzuki, Kanagawa (JP); Kohji Sakai, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/722,559

(22) Filed: May 27, 2015

(65) Prior Publication Data

US 2015/0346484 A1 Dec. 3, 2015

(30) Foreign Application Priority Data

Jun. 2, 2014 (JP) .................. 2014-114207

(51) Int. Cl.
*B41J 2/45* (2006.01)
*B41J 2/47* (2006.01)
*G02B 26/12* (2006.01)
*G03G 15/04* (2006.01)
*G03G 15/043* (2006.01)

(52) U.S. Cl.
CPC .............. *G02B 26/127* (2013.01); *B41J 2/45* (2013.01); *B41J 2/473* (2013.01); *G02B 26/12* (2013.01); *G02B 26/123* (2013.01); *G03G 15/0435* (2013.01); *G03G 15/04072* (2013.01); *B41J 2002/453* (2013.01)

(58) Field of Classification Search
USPC ................. 347/236, 237, 246, 247
See application file for complete search history.

(56) References Cited

U.S. PATENT DOCUMENTS

| 8,072,667 B2 | 12/2011 | Suzuki et al. |
| 8,670,013 B2 | 3/2014 | Suzuki |
| 8,823,762 B2 * | 9/2014 | Yamazaki .............. G03G 13/04 347/236 |
| 2005/0045813 A1 | 3/2005 | Suzuki et al. |
| 2005/0093962 A1 | 5/2005 | Miyatake et al. |
| 2005/0179971 A1 | 8/2005 | Amada et al. |
| 2006/0077500 A1 | 4/2006 | Hayashi et al. |

(Continued)

FOREIGN PATENT DOCUMENTS

| JP | 2008-064995 | 3/2008 |
| JP | 2009-244843 | 10/2009 |
| JP | 2014-010414 | 1/2014 |

OTHER PUBLICATIONS

U.S. Appl. No. 13/721,099, filed Dec. 20, 2012.

*Primary Examiner* — Kristal Feggins
*Assistant Examiner* — Kendrick Liu
(74) *Attorney, Agent, or Firm* — Oblon, McClelland, Maier & Neustadt, L.L.P.

(57) ABSTRACT

An optical scanning device includes: a light source that emits a laser beam modulated and driven according to an image forming signal; a scanning optical system that includes a polygon mirror to scan a surface of a photoconductor with the laser beam from the light source; a surface identifying unit that associates a sub-scanning position by the polygon mirror with each surface of the polygon mirror; and a light-amount adjusting unit that adjusts a light amount of the light source according to the sub-scanning position, for each surface of the polygon mirror.

7 Claims, 9 Drawing Sheets

(56) References Cited

U.S. PATENT DOCUMENTS

| | | |
|---|---|---|
| 2006/0187294 A1 | 8/2006 | Saisho et al. |
| 2007/0091398 A1 | 4/2007 | Ueda et al. |
| 2007/0211324 A1 | 9/2007 | Sakai et al. |
| 2007/0211326 A1 | 9/2007 | Saisho et al. |
| 2007/0236557 A1 | 10/2007 | Imai et al. |
| 2007/0253048 A1 | 11/2007 | Sakai et al. |
| 2008/0024589 A1 | 1/2008 | Ueda et al. |
| 2008/0025759 A1 | 1/2008 | Ichii et al. |
| 2008/0055692 A1 | 3/2008 | Saisho et al. |
| 2008/0068678 A1 | 3/2008 | Suzuki et al. |
| 2008/0068689 A1 | 3/2008 | Saisho et al. |
| 2008/0068693 A1 | 3/2008 | Hayashi et al. |
| 2008/0088889 A1 | 4/2008 | Suzuki |
| 2008/0124125 A1* | 5/2008 | Hirano ................. G03G 15/326 399/151 |
| 2008/0170282 A1 | 7/2008 | Amada et al. |
| 2008/0204846 A1 | 8/2008 | Itabashi et al. |
| 2009/0002792 A1 | 1/2009 | Sakai et al. |
| 2009/0147336 A1 | 6/2009 | Suzuki et al. |
| 2009/0153933 A1 | 6/2009 | Tsuchiya et al. |
| 2009/0231656 A1 | 9/2009 | Suzuki et al. |
| 2010/0046967 A1 | 2/2010 | Suzuki |
| 2011/0025813 A1 | 2/2011 | Suzuki et al. |
| 2011/0063594 A1 | 3/2011 | Sakai |
| 2011/0228368 A1 | 9/2011 | Sakai et al. |
| 2013/0286134 A1* | 10/2013 | Yamazaki ............ G03G 15/043 347/118 |
| 2015/0042740 A1 | 2/2015 | Suhara et al. |

\* cited by examiner

OPTICAL SCANNING DEVICE, METHOD OF ADJUSTING OPTICAL SCANNING DEVICE, AND IMAGE FORMING APPARATUS

CROSS-REFERENCE TO RELATED APPLICATION(S)

The present application claims priority to and incorporates by reference the entire contents of Japanese Patent Application No. 2014-114207 filed in Japan on Jun. 2, 2014.

BACKGROUND OF THE INVENTION

1. Field of the Invention

The present invention relates to an optical scanning device.

2. Description of the Related Art

In color image forming apparatuses such as color laser printers, different color information is written with scanning beams of laser beams by multiple optical scanning units (optical scanning device) with scanning-image-forming optical systems independently to multiple photoconductors that are rotated by a driving mechanism, respectively. A tandem color image forming apparatus has been available in which by such writing with scanning beams, electrostatic latent images are formed, and these electrostatic latent images are visualized by multiple visualizing units into visible images in different colors, respectively, and then transferred onto a transfer material overlapped with each other, thereby obtaining a color image.

The respective optical scanning units described above emit laser beams from a laser constituted of a semiconductor that is driven and controlled according to a read image information signal of each color. The laser beam is concentrated on a surface of the photoconductor that is uniformed charged through optical parts, such as a polygon mirror and a lens, and scanned in a main scanning direction. On the surface of the rotating photoconductor, an image signal corresponding to multiple scanning beams are written as scanning beams at predetermined intervals, and an electrostatic latent image is formed thereon.

In such an image forming apparatus, by misregistration in a sub-scanning direction on a surface of the photoconductor caused by vibration of the optical scanning device from inclination of the surface of a polygon mirror and rotation of the polygon mirror, banding (density unevenness in the sub-scanning direction, horizontal strips) in a small pitch of about 1 millimeter (mm) to several mm in a cycle of a single rotation component of the polygon mirror occurs.

For the banding described above that is one of the points focused on in image quality, various techniques to suppress this phenomenon have been studied.

Particularly, as for the surface inclination of polygon mirrors, the precision in processing mirrors have almost reached the limit, and countermeasures other than that in the polygon processing have been demanded.

Near the surface of the respective photoconductors, a non-contact displacement meter to detect a displacement amount relative to an X-axis direction, and a non-contact displacement meter to detect a displacement amount relative to a Z-axis direction are arranged.

To each cylindrical lens in the optical scanning device, a piezoelectric element to shift in the Z-axis direction is mounted. Each optical detector sensor outputs a synchronization detecting signal, a light-amount monitor signal, and a sub-scanning displacement signal for a corresponding photoconductor drum.

A scanning control device controls the piezoelectric element for each photoconductor drum, based on a result of combining the output of the non-contact displacement meters and the sub-scanning displacement signal.

With the above configuration, a sub-scanning displacement is variably adjusted by minutely shifting the cylindrical lens in the Z-axis direction according to banding, and banding can be thereby suppressed.

However, in the above method, a structure to make a sub-scanning position variable by causing mechanical vibration to a cylindrical lens of by a piezoelectric element is required. Therefore, there is a scope for improvement in size and cost for a high-voltage power-supply circuit for piezoelectric driving and an optical housing.

In view of the above, there is a need to provide an optical scanning device that enables banding (density unevenness in a sub-scanning direction) to be suppressed by adjusting a laser beam position in the sub-scanning direction, and that achieves a high image quality and stabilizes an image quality at low cost.

SUMMARY OF THE INVENTION

It is an object of the present invention to at least partially solve the problems in the conventional technology.

An optical scanning device includes: a light source that emits a laser beam modulated and driven according to an image forming signal; a scanning optical system that includes a polygon mirror to scan a surface of a photoconductor with the laser beam from the light source; a surface identifying unit that associates a sub-scanning position by the polygon mirror with each surface of the polygon mirror; and a light-amount adjusting unit that adjusts a light amount of the light source according to the sub-scanning position, for each surface of the polygon mirror.

A light-amount adjusting method is of an optical scanning device that includes a light source emitting a laser beam modulated and driven according to an image forming signal, and a scanning optical system including a polygon mirror to scan a surface of a photoconductor with a laser beam from the light source. The method includes: associating a sub-scanning position by the polygon mirror with each surface of the polygon mirror; and adjusting a light amount of the light source according to the sub-scanning position for each surface of the polygon mirror.

A light-amount adjusting method is of an optical scanning device that includes a light source emitting a laser beam modulated and driven according to an image forming signal, and a scanning optical system including a polygon mirror to scan a surface of a photoconductor with a laser beam from the light source. The method includes: detecting a sub-scanning position by the polygon mirror; associating the sub-scanning position detected at the detecting with a surface of the polygon mirror; storing sub-scanning positions of a surface of the polygon mirror by grouping in a predetermined range, as a sub-scanning position group; and adjusting a light amount of the light source for each surface of the polygon mirror according to the sub-scanning position group.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

The feature of an optical scanning device according to the present invention is to have a light source that emits a laser beam that is modulated and driven according to an image forming signal, a scanning optical system that includes a polygon mirror scanning a surface of a photoconductor with a laser beam from the light source, a surface identifying unit that associates a sub-scanning position by the polygon mirror with each surface of the polygon mirror, and a light-amount adjusting unit that adjusts a light amount of the light source according to the sub-scanning position.

Next, an optical scanning device, a method of adjusting an optical scanning device, and an image forming apparatus according to the present invention are explained in further details.

Because embodiments described below are exemplary embodiments of the present invention, various limitations are given thereto; however, the scope of the present invention is not limited to these forms unless otherwise described as limiting the present invention.

(First Embodiment of Optical Scanning Device)

Figure 1:
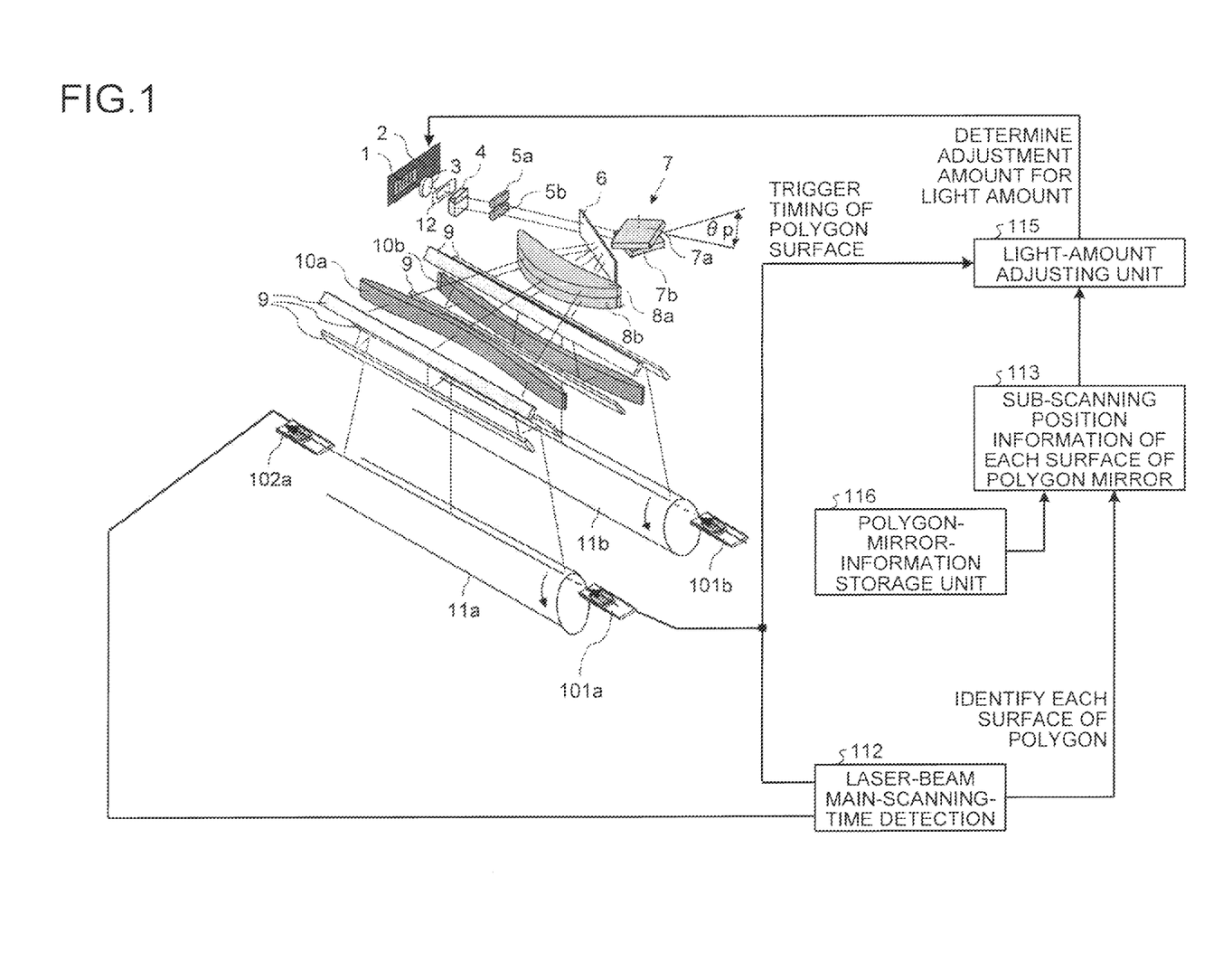
FIG. 1 is a schematic perspective view showing a configuration of an optical scanning device according to a first embodiment of the present invention.

FIG. 1 is a schematic perspective view showing a configuration of an optical scanning device according to a first embodiment of the present invention. Moreover, FIG. 2 is an explanatory diagram for explaining a state of a laser beam L passing through a half mirror prism 4 and cylindrical lenses 5a and 5b in the first.

From a surface emitting laser 1 in which multiple light emitting regions are arranged two-dimensionally, a laser beam is emitted based on a driving signal from a light emission substrate 2 on which a driving circuit is mounted. The laser beam (although more than one laser beam is emitted actually, the laser beam is illustrated as one beam for simplicity's sake) emitted from the surface emitting laser 1 is formed into a parallel flux by a coupling lens 3, shaped by passing through an aperture 12, and then enters the half mirror prism 4.

Out of laser beams that are obtained by substantially equally dividing the light amount in a sub-scanning direction by the half mirror prism 4, a laser beam (laser beam L11 in FIG. 2) that has passed directly through a half-silvered mirror 4a of the half mirror prism 4 enters the cylindrical lens 5a. Meanwhile, out of the laser beams that are obtained by substantially equally dividing the light amount in the sub-scanning direction by the half mirror prism 4, a laser beam (laser beam L12 in FIG. 2) that is reflected on the half-slivered mirror 4a of the half mirror prism 4, and then further reflected on a reflection surface 4b enters the cylindrical lens 5b.

Figure 2:
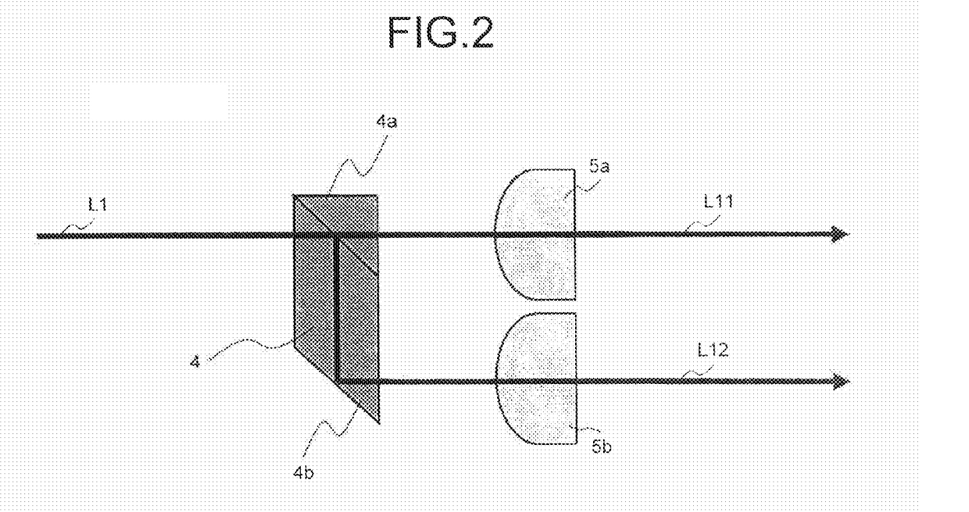
FIG. 2 is an explanatory diagram for explaining a state of a laser beam L passing through a half mirror prism 4 and cylindrical lenses 5a and 5b in the optical scanning device according to the first embodiment of the present invention.

From the surface emitting laser 1, multiple laser beams are emitted (one representative laser beam is illustrated in FIG. 1 and FIG. 2), and enters a polygon mirror deflector 7 through a soundproof glass 6, after passing through the half mirror prism 4 and the cylindrical lenses 5a and 5b. That is, deflected laser beams are emitted toward a scanning-image-forming optical system through the soundproof glass 6.

The soundproof glass 6 is a glass that is provided in a window of a soundproof housing not shown of the polygon mirror deflector 7 constituted of polygon mirrors.

The polygon mirror deflector is formed in double layer with an upper polygon mirror 7a and a lower polygon mirror 7b in the sub-scanning direction (direction of rotation axis of the polygon mirror deflector 7) as shown, and is configured to be rotated about a rotation axis by a driving motor not shown.

The upper polygon mirror 7a and the lower polygon mirror 7b have the same form with four deflection reflecting surfaces in the present embodiment, and the deflection reflecting surface of the lower polygon mirror 7b is shifted by a predetermined angle: θp (=45 degrees) relative to the deflection reflecting surface of the upper polygon mirror 7a.

At positions corresponding to the upper polygon mirror 7a and the lower polygon mirror 7b, a first scanning lens 8a, a first scanning lens 8b, a second scanning lens 10a, a second scanning lens 10b, and optical-path bending mirrors 9 are arranged, respectively. Moreover, the laser beam L passes through these components in the scanning-image-forming optical system, and then optically scans a photoconductor 11a and a photoconductor 11b to be subjects of scanning.

The first scanning lens 8a, the second scanning lens 10a, and the optical-path bending mirror 9 form one set of the scanning-image-forming optical system that guides laser beams that are deflected by the upper polygon mirror 7a onto the photoconductor 11a being a corresponding optical scanning position, and that forms multiple optical spots that are separated in the sub-scanning direction.

Similarly, the first scanning lens 8b, the second scanning lens 10b, and the optical-path bending mirror 9 form one set of the scanning-image-forming optical system that guides laser beams that are deflected by the lower polygon mirror 7b onto the photoconductor 11b being a corresponding optical scanning position, and that forms multiple optical spots that are separated in the sub-scanning direction.

As described, multi-beam scanning is performed on the surface of the photoconductor 11a with laser beams that are deflected by the upper polygon mirror 7a of the polygon mirror deflector 7. Similarly, multi-beam scanning is performed on the surface of the photoconductor 11b with laser beams that are deflected by the lower polygon mirror 7b of the polygon mirror deflector 7.

The deflection reflecting surfaces of the upper polygon mirror 7a and the lower polygon mirror 7b of the polygon mirror deflector 7 are shifted from each other by 45 degrees in a rotation direction. Therefore, when a laser beam deflected by the upper polygon mirror 7a optically scans the photoconductor 11a, a laser beam deflected by the lower polygon mirror 7b is not guided to the photoconductor 11b. Moreover, when a laser beam deflected by the lower polygon mirror 7b optically scans the photoconductor 11b, a laser beam deflected by the upper polygon mirror 7a is not guided to the photoconductor 11a.

That is, optical scanning of the photoconductors 11a and 11b are alternately performed at shifted times.

Figure 3A:
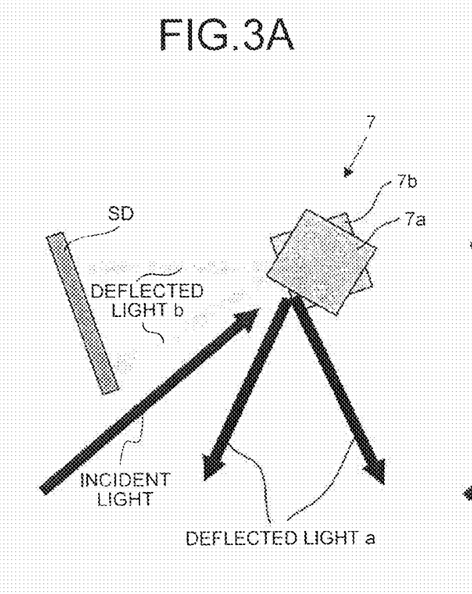
FIG. 3A and FIG. 3B are explanatory diagrams for explaining a state of optical scanning in the optical scanning device according to the first embodiment of the present invention.
Figure 3B:
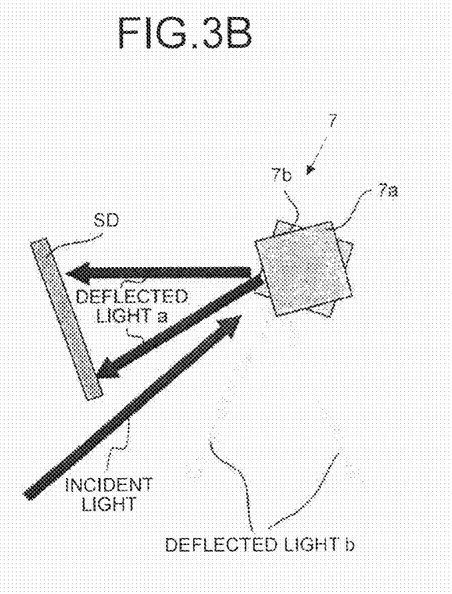

FIG. 3 is an explanatory diagram for explaining a state of optical scanning in the first embodiment. Because FIG. 3 is an explanatory diagram, complication is avoided therein, and a laser beam (more than one beam in actual fact) that enters the polygon mirror deflector 7 is indicated as an incident light, deflected laser beams are indicated as a deflected light a and a deflected light b.

FIG. 3A shows a state in which the incident light enters the polygon mirror deflector 7, and the deflected light a that is reflected on the upper polygon mirror 7a to be deflected is guided to an optical scanning position. AT this time, the deflected light b deflected by the lower polygon mirror 7b does not travel toward the optical scanning position but toward a light shielding unit SD.

FIG. 3B shows a state in which the deflection light b that is reflected on the lower polygon mirror 7b to be deflected is guided toward the optical scanning position. At this time, the deflected light a deflected by the upper polygon mirror 7a does not travel toward the optical scanning position, but toward the light shielding unit SD.

It is preferable that a deflected light that is not guided to the optical scanning position be shielded using the appropriate light shielding unit SD as shown in FIG. 3 so that while one of the deflected lights deflected by the polygon mirrors is guided to the optical scanning position, the other deflected light does not act as "ghost light".

As described above, in the embodiment shown in FIG. 1, optical scanning of the photoconductors 11a and 11b is alternately performed. Therefore, for example, if the light intensity of the light source is modulated with an image signal of a block image when optical scanning of the photoconductor 11a is performed, and the light intensity of the light source is modulated by an image signal of a cyan image when optical scanning of the photoconductor 11b is performed, it is possible to write an electrostatic latent image of the black image on the photoconductor 11a, and an electrostatic latent image of the cyan image on the photoconductor 11b.

Figure 4:
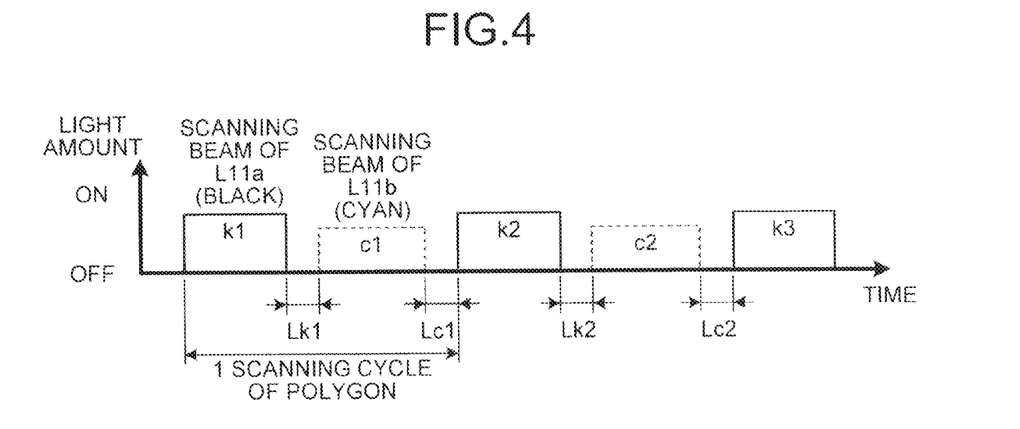
FIG. 4 is a diagram showing one example of a time chart when a black image and a cyan image are written by a common light source.

FIG. 4 shows a time chart of a case in which all light sources are lit in an effective scanning region when a black image and a cyan image are written by a common light source (the surface emitting laser 1 in FIG. 1). A solid line in FIG. 4 indicates a portion corresponding to writing the black image, and a broken line indicates a portion corresponding to writing the cyan image.

The main scanning timing for writing the black image and the cyan image is determined by detecting a laser beam traveling toward an optical-scan start position by a synchronization detecting unit that is arranged outside an effective scanning region.

If the light emission intensity of the light source is set equally in a time region of writing the black image and in a time region of writing the cyan image, a relative difference in the transmittance and the reflectivity of an optical device can occur in each of optical paths to the photoconductors 11a and 11b from the light source. In such a case, the light amounts of laser beams that reach the respective photoconductors differ from each other. Therefore, as shown in FIG. 4, the light amounts that reach surfaces of different photoconductors uniform by varying the light emission intensity at the light source when optical scanning surfaces of different photoconductors.

The laser beam detectors 101a (101b) and 102a shown in FIG. 1 are detectors that detect a laser beam, and a light receiving means is formed with a light receiving unit (hereinafter, photodetector (PD)) that detect scanning timing of a scanned laser beam, an amplifier (AMP) circuit that amplifies an output signal from PD, and the like.

The laser beam detectors are arranged at both ends in optical scanning (although the laser beam detectors 101a, 101b, and the laser beam detector 102a are also similarly arranged, only a detector corresponding to one, the laser beam detector 101a, is illustrated), and by measuring time intervals of two output signals, a scanning time of each surface of the polygon mirror is detected.

Figure 5:
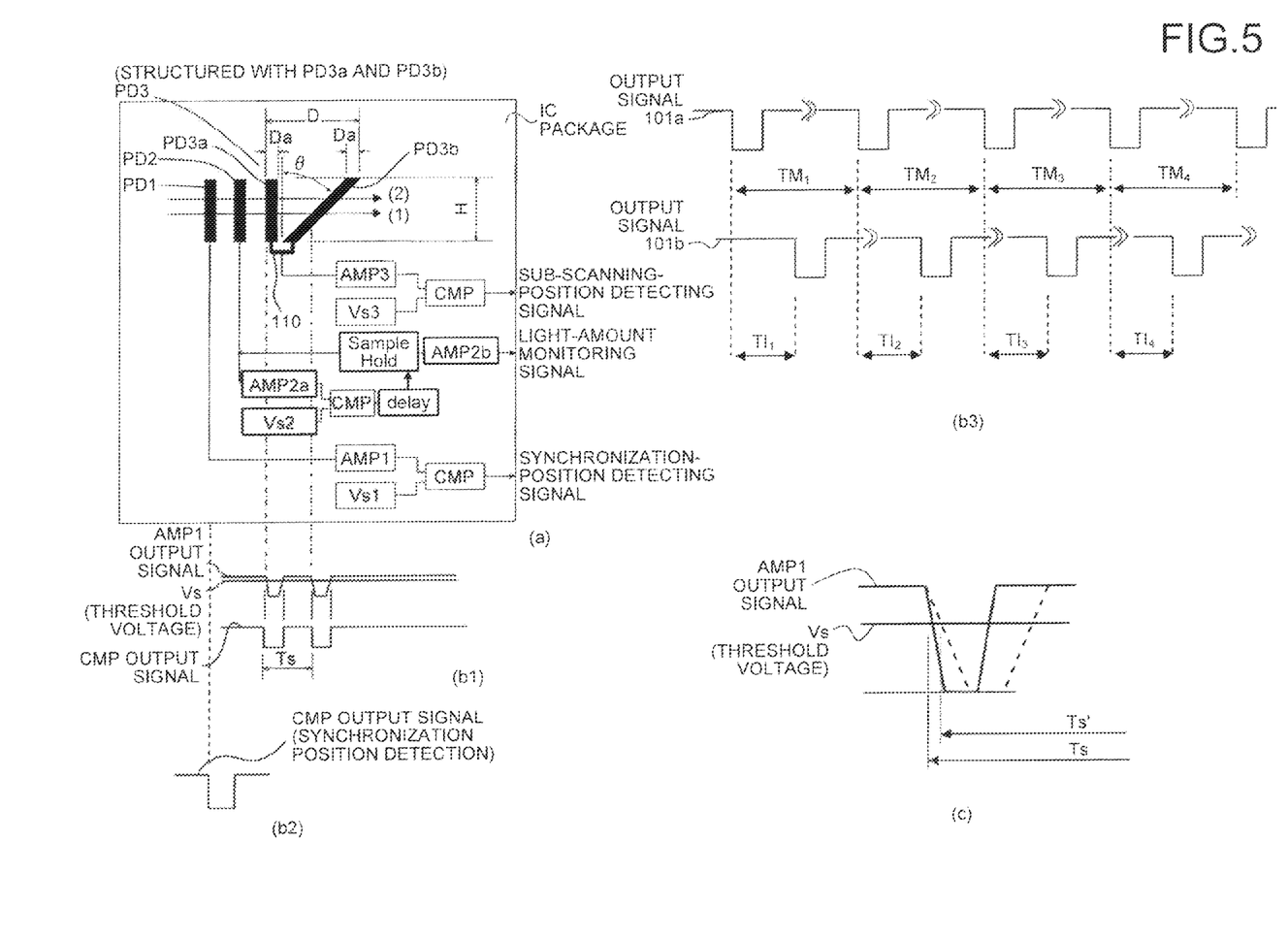
FIG. 5 shows a block diagram showing one example of a configuration of a laser beam detector 101 and one example of a timing chart.

FIG. 5 shows details of a light receiving unit as the light receiving means (which is an integrated circuit (IC) package, and is hereinafter referred to as a photo IC), and an IC circuit part (this package is formed with a laser transparent member). The laser beam detector 101 is constituted of the photo IC and a circuit board on which the photo IC is mounted.

Only functions related to the embodiment of FIG. 1 among those in FIG. 5 are explained in detail herein. In synchronization timing detection in the main scanning direction, a PD 1 is used as a light receiving unit. A scanning beam that is received by the PD 1 is subjected to comparison between a voltage after passing through an amplifier circuit AMP1 and a threshold voltage Vs1 in a comparator CMP, and a light receiving signal is binarized, to generate a synchronization-position detecting signal ((b2) in FIG. 5).

When laser beams are scanned, with rotation of the polygon mirror, on the laser beam detectors 101a and 101b arranged at both ends, two synchronization-position detecting signals are generated ((b3) in FIG. 5). Time intervals of the signals (TM or TI) are measured. Strictly speaking, because a four-face polygon mirror is used in the present embodiment, four kinds of time intervals (TM1 to TM4, or TI1 to TI4) are measured. This is because it is dependent on accuracy in processing the polygon mirror, as for TM1 to TM4, because the angle split accuracy of each surface is not completely 90 degrees and varies in a second unit, the variation in angle can be extracted as a difference in time interval (several nanosecond (ns) level) to be identified, associating with each surface. To measure the above difference in time interval in the several ns level stably, a high-speed reference clock is necessary, and when it leads to a high cost, by varying the split angles by a large amount in advance as 89 degrees, 91 degrees, 90 degrees, and 90 degrees, the difference in time intervals can be increased to several microsecond (μs) level so that stable measurement is possible and a general-purpose reference clock can be used to lower the cost.

Furthermore, as for TI1 to TI4, because the surface accuracy of each surface is not completely flat and varies by a several tens of nm level, it can be extracted as a difference (several ns level) in time interval of the surface accuracy variation to be identified associating with each surface. Note that because a rotation unevenness component derived from a motor unit of the polygon mirror deflector is superimposed in either case, it is preferable that averaging be performed with several scanning beams at measurement.

Although a surface identifying method (surface identifying unit) described above is a method in which a scanning beam by the polygon mirror is used, a method in which a marking (not shown) is given to a part of the polygon mirror and the marking is optically detected is also applicable other than the above method.

For the sub-scanning position corresponding to the identified surface of the polygon mirror, a surface inclination amount is measured at a manufacturing inspection of the polygon mirror deflector, or a sub-scanning position is measured at a manufacturing inspection of the optical scanning device, together with the above time interval (TM or TI) in advance, and polygon mirror information thereof is written in a storage unit 116.

Figure 6:
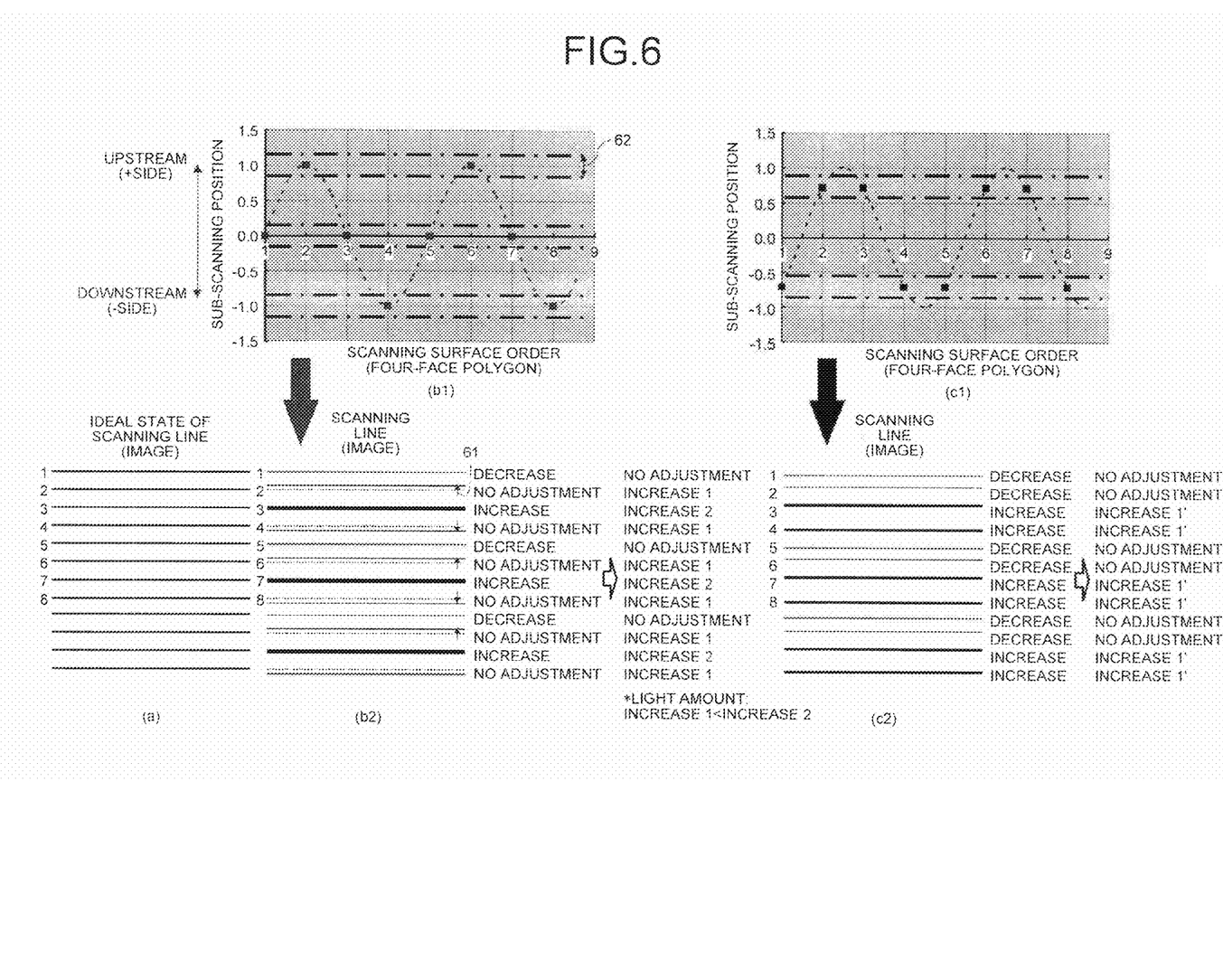
FIG. 6 is an explanatory diagram showing relation between a sub-scanning position and a scanning line on a surface of a polygon mirror.

Next, light amount correction (a light-amount adjusting unit) is described in detail. FIG. 6 is an explanatory diagram showing relation between a sub-scanning position and a scanning line on a surface of the polygon mirror.

FIG. 6 indicates, at (a), by an image, a state in which the sub-scanning position is in an ideal condition and scanning line intervals are uniform, and therefore banding does not occur. On the other hand, a state in which scanning line intervals are uneven due to variation of the sub-scanning position mainly caused by surface inclination of the polygon mirror, and banding occurs is shown at (b1), (b2), (c1) and (c2) in FIG. 6. FIG. 6 indicates, at (b1), an embodiment in which a second surface and a fourth surface correspond to the largest and the smallest relative to a first surface and a third surface among four surfaces of the polygon.

Meanwhile, as for mirror finish processing of a polygon mirror portion, a processing bite is fixed, the polygon mirror portion (work) to be processed into mirror finish is mounted on an angle split panel, mirror-finish processing is performed on each surface while rotating from the first surface to the fourth surface sequentially by 90 degrees, and four surfaces are completed in one rotation. If the work is mounted on the angle split panel slightly inclined relative to the processing bite, or because of flatness due to rotation of the angle split panel, the surface of the polygon mirror processed into mirror finish tends to incline in a form of a sine wave as indicated by a broken line at (b1) in FIG. 6. From the trajectory in a sine wave and relative positional relation of the respective surfaces of the polygon mirror, the surface inclination tendency of the polygon mirror is determined.

Characteristic examples are shown at (b1) in FIG. 6 and FIG. 6 (c1), and scanning lines are shown at (b2) and (c2) in FIG. 6.

A broken line at (b2) in FIG. 6 shows an ideal position, and the sub-scanning position is as shown at (b1) in FIG. 6, and therefore, it indicates that scanning is performed with deviations from the ideal position in a direction of an arrow 61. Moreover, as for upstream and downstream, the downstream corresponds to a direction to which an arrow in FIG. 1 points, which is a rotating direction of the photoconductor 11a (11b), and the upstream corresponds to a direction opposite to the arrow. An amount for which a light amount of a scanning beam is adjusted is described as "increase", "decrease", and "no adjustment", and visualized in the thickness of a scanning line.

As for the light amount adjustment, the light amount is adjusted to be increased when an adjacent scanning interval is large, and on the other hand, the light amount is adjusted to be decreased when an adjacent scanning interval is small. Specifically, according to patterns shown in Table 1, it is determined whether a scanning position of a prior surface and a following surface are relatively upstream (+) or downstream (−) with respect to a concerned polygon surface.

TABLE 1

| Pattern | Prior surface | Following surface | Light amount |
|---|---|---|---|
| 1 | (+) | (−) | Increase |
| 2 | (−) | (+) | Decrease |
| 3 | (+) | (±) | Increase |
| 4 | (±) | (+) | Decrease |
| 5 | (−) | (±) | Decrease |
| 6 | (±) | (−) | Increase |
| 7 | (+) | (+) | No adjustment |
| 8 | (−) | (−) | No adjustment |
| 9 | (±) | (±) | No adjustment |

Specifically, the patterns are classified such that pattern 1 of (+) to (−) in order of a prior surface to a following surface is increase in a light amount, pattern 2 of (−) to (+) is decrease in a light amount, pattern 3 of (+) to (+) or (−) to (−) is no adjustment in a light amount, and the like. In pattern classification, at (b1) and (b2) in FIG. 6, ones within ranges between long and short dotted lines as indicated by an arrow 62 (three regions at (b1) in FIG. 6 and two regions at (b2) in FIG. 6) are regarded as "(±)": no variation".

According to the above, in the embodiment ((b1), (b2) in FIG. 6), as for the first surface (a fifth surface) of the polygon, the scanning positions of the prior and the following surfaces are (−) to (+), and the light amount is decreased from a normal amount. As for the second surface, the prior and the following surfaces are (−) to (−), and the light amount adjustment is not necessary. As for the third surface, the prior and the following surfaces are (+) to (−), and the light amount is increased. As for the fourth surface, the prior and the following surfaces are (+) to (+), and the light amount adjustment is not necessary. According to the light amount adjustment described above, the light amount is adjusted for each.

In a case of the embodiment ((c1) and (c2) in FIG. 6), as for the first surface (a fifth surface) of the polygon, the scanning positions of the prior and the following surfaces are (±) to (+), and the light amount is decreased from a normal amount. As for the second surface, the prior and the following surfaces are (−) to (±), and the light amount is decreased. As for the third surface, the prior and the following surfaces are (±) to (−), the light amount is increased. As for the fourth surface, the prior and the following surfaces are (+) to (±), the light amount is increased. According to the light amount adjustment described above, the light amount is adjusted for each.

Moreover, the light amount to be increased or decreased is determined according to an adjacent scanning interval, and light amount adjustment proportional to the adjacent scanning interval is preferable to avoid banding from being visually recognized.

For example, under a condition of a sub-scanning density 1200 dot per inch (dpi), it is 21.2 μm (=25.4 mm/1200=a)

when a relative value of the sub-scanning position (a vertical axis at (b1) in FIG. 6) is 0. On the other hand, when it is +1.0, α×ks×(+1.0), (ks: a coefficient relating to a sub-scanning scale of the scanning optical system and is a positive value smaller than 1), or when it is −0.5, it is indicated that a deviation of the sub-scanning position of α×ks×(−0.5) occurs.

When relative values of the sub-scanning positions of the prior and the following surfaces are β and α, respectively, an adjusted light amount P is acquired (P0 is a reference light amount) from a following equation. Increase or decrease of the light amount is determined by a pattern in Table 1.

$$P=P0\times(\alpha+|\beta|+|\gamma|)/\alpha$$

The adjusted light amount is acquired for the third surface at (b1) in FIG. 6 as an example, because it is pattern 1, the light amount is increased. The adjusted light amount is (when ks=0.1), $$(21.2+|21.2\times0.1\times(+1.0)|+|21.2\times0.1\times(-1.0)|)/21.2=1.2$$

and is 1.2 times as much as the reference light amount. The fifth surface is "decrease in light amount", and 0.83 times (=1/1.2) as much.

Furthermore, for the regions within the range indicated by the arrow 62 at (b1) and (c1) in FIG. 6, positions with which banding is not visually recognized without changing the light amount are grouped in advance, and it is regarded that the sub-scanning positions in the group are at substantially the same position. The sub-scanning position thereof is a mean value (center) in the group.

Figure 7:
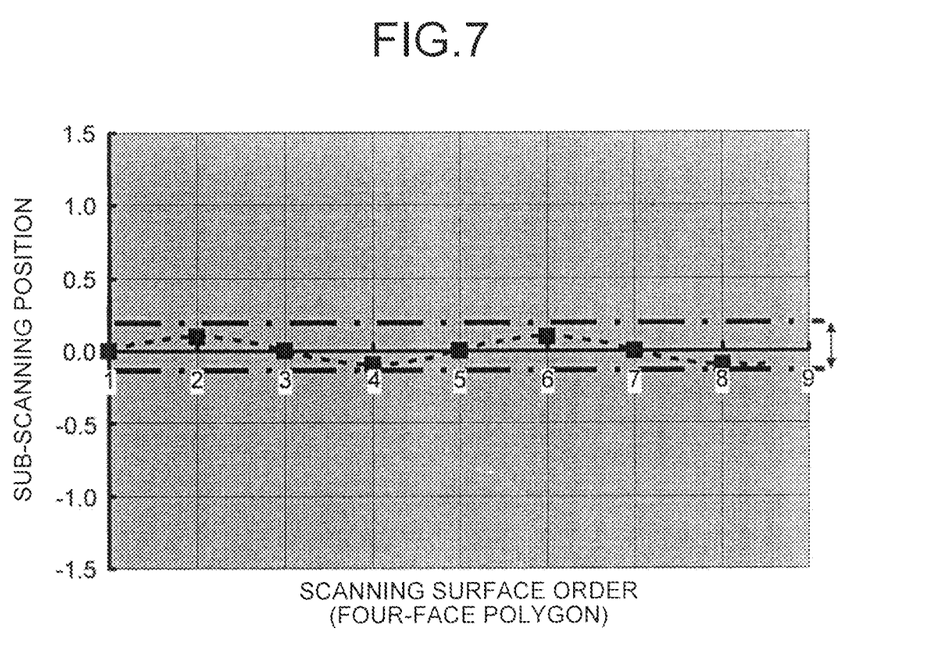
FIG. 7 is an explanatory diagram showing another example of the sub-scanning position on the surface of the polygon mirror.

The number of groups in grouping varies according to an optical scanning device, and FIG. 6 shows an example of three at (b1) and an example of two at (c1), and FIG. 7 shows an example of one, and a counter counts the number of groups. FIG. 7 is an explanatory diagram showing another example of the sub-scanning position on a surface of the polygon mirror, and when there is only one group as shown in FIG. 7, it is determined to be at a level at which banding does not occur, and the light amount adjustment itself is not performed.

Figure 8:
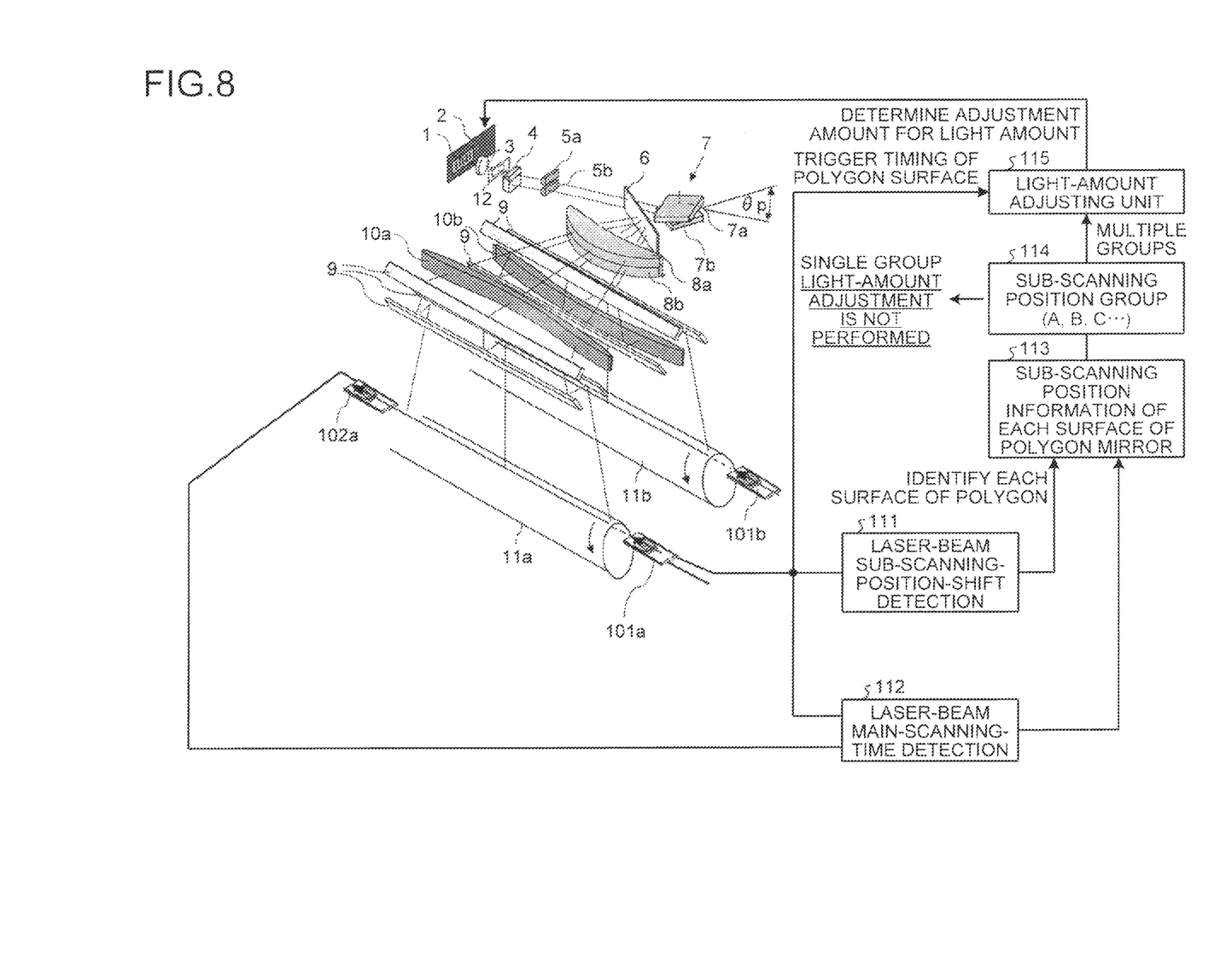
FIG. 8 is a schematic perspective view showing a an optical scanning device according to a second embodiment of the present invention.

The number of groups is stored as sub-scanning position information, and counted at step 114 in FIG. 8 (a sub-scanning-position-group storage unit).

It is preferable that a light amount be adjusted only when the number of groups is more than one.

Meanwhile, because a synchronization-detecting signal disappears when rotation of the polygon mirror stops because a print job of image forming is finished, or the like, the surface identifying information of the polygon mirror is cancelled, and generation of trigger timing of the light amount adjustment is also disabled. Therefore, for detection of a sub-scanning position, each time a synchronization signal that indicates a state in which the polygon mirror is controlled to be rotated at a uniform speed is output, the light source is caused to emit light so that the sub-scanning position can be detected by the laser beam detector, and scanning beams are detected, thereby grouping the sub-scanning positions described above.

(Second Embodiment of Optical Scanning Device)

Next, FIG. 8 is shown as another embodiment (second embodiment). Points that differ from FIG. 1 are described in details.

Although the laser beam detector 101a (101b) shown in FIG. 8 is similar to the laser beam detector shown in FIG. 1, a light receiving means is formed with a light receiving unit (hereinafter, PD) that detects a sub-scanning-position shift amount (relative position shift: hereinafter LBS) other than synchronization position, an AMP circuit that amplifies an output signal from PD, and the like.

The laser beam detector 101a (101b, 102a also similarly) is arranged at an optically (particularly, an fθ characteristic, similar in the following) equivalent position as a laser beam with which a surface of the photoconductor 11 is scanned similarly to that in FIG. 1.

The laser beam detector 101a can also detect a relative shift amount in the sub-scanning direction that is to be a cyclic component of a banding image, in addition to synchronization detection.

The shift amount detection of the sub-scanning position is described in detail. The shift amount detection of the sub-scanning position is achieved by a light receiving unit PD3, an amplifier (AMP3) that amplifies an output of PD3, and a comparator circuit (CMP) that performs waveform shaping.

The light receiving unit PD3 includes two light receiving units PD3a and PD3b to be two light receiving regions, and each thereof is electrically connected to a circuit pattern or a bonding (a portion indicated by a reference numeral 110 at (a) in FIG. 5), and can be handled as if it is a single unit of light receiving unit.

The light receiving unit PD3a is arranged such that an edge (an end surface at the scanning upstream) of the light receiving unit PD3a is perpendicular to a scanning beam (parallel to the sub-scanning direction), and on the other hand, the light receiving unit PD3b is arranged such that an edge of the light receiving unit (an end surface of at the scanning upstream) forms an angle θ relative to the sub-scanning direction. Therefore, the two light receiving units are arranged such that the edges thereof form the angle θ relative to the sub-scanning direction.

It is arranged such that angle between the two light receiving regions (the light receiving unit PD3a and the light receiving unit PD3b) is the angle θ (0°<θ<90°). The angle θ is preferable to be 30° to 60°. The embodiment discloses an example of 45°, and it is the most preferable example. This is because if the angle is smaller than 30°, variation of Ts to a laser beam decreases to degrade the detection sensitivity. On the other hand, if the angle exceeds 60°, an effective detection height H in the sub-scanning direction becomes small relative to an entire width D of a light receiving surface in the main scanning direction, and to maintain a required height of the effective detection height H, the entire width D of the light receiving surface becomes large, causing a problem that the light receiving surface enters an image region, or a problem that a scanning lens becomes long and large because an effective region of the scanning optical system is required to be set large.

The height H in the sub-scanning direction and the entire width D of the light receiving surface are preferable to be set as H=1 to 3 mm, D=5 mm or smaller, respectively so that the above problems are not caused. 45° enables balanced distribution to be allowable, and is most preferable.

By passing a scanning beam through the light receiving units PD3a and PD3b, an output signal in the timing chart shown at (b) in FIG. 5 is generated. A comparator signal is output by a scanning beam passing therethrough, and the time interval Ts between falls of two pulses is dependent on a position of sub-scanning scanned with a laser beam. For example, when a laser beam (1) at (a) in FIG. 5 is shifted to a position of a laser beam (2), and when a time interval difference is ΔTs, a change in a shift amount of the sub-scanning position of the laser beam Δh can be acquired by Equation 1 below.

$$\Delta h = (v \times \Delta Ts)/\tan\theta \quad (1)$$

(where v indicates a speed of a scanning laser beam)

Similarly to FIG. 1, the surface emitting laser 1 with which scanning with multiple laser beams of respective colors are simultaneously performed is used, and incident laser beams to all the light receiving units PD that are arranged in the laser beam detector 101a (101b) are optimized as follows.

Figure 9A:
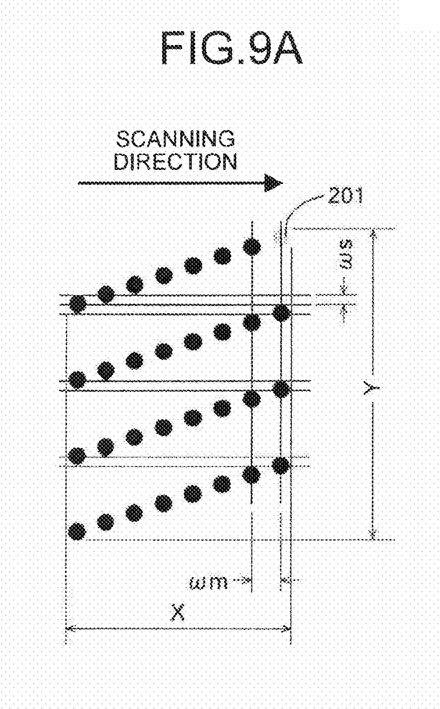
FIG. 9A and FIG. 9B are explanatory diagrams showing a two-dimensional arrangement on a scanned surface at a time of rest.
Figure 9B:
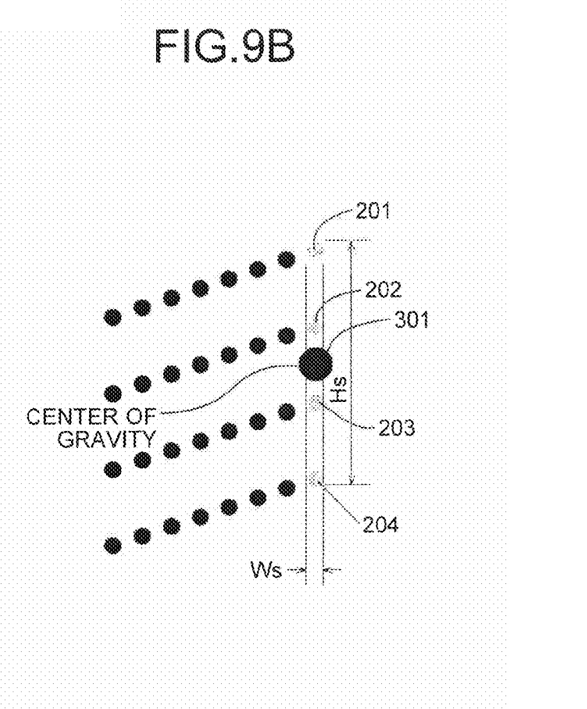

Detailed description is given referring to FIG. 9A and FIG. 9B. FIG. 9A and FIG. 9B both show a two-dimensional arrangement on a scanned surface at a time of rest.

ωm indicates a beam pitch in the main scanning direction and ωs indicates a beam pitch in the sub-scanning direction, and respective beam intervals are uniform. An array of 32 beams in total with four oblique lines each of which has eight beams is shown. 32 beams indicates a light emitting region (also electrically connected so as to enable light emission), and it is indicated that a laser beam 201, a laser beam 202, a laser beam 203, and a laser beam 204 among all beams are parts actually energized and lit, and others are not lit. A width of a light emitting region in the main scanning direction is X, a width of a light emitting region in the sub-scanning direction is Y.

When the light amount is not sufficient (a threshold voltage in FIG. 9B is not reached) when the light receiving unit PD1a is scanned with the laser beam 201 (FIG. 9A) that forms an image on a scanned surface as an optical spot, it is preferable that the surface emitting laser emit more than one laser beam as shown in FIG. 9B to acquire the light amount.

In the example shown in FIG. 9B, by lighting the laser beams 201 to 204 aligned in a line in the main scanning direction to form a laser beam group when the light receiving unit is scanned, the light amount is increased (four times as much with four beams simply) compared to a conventional case, and thereby acquiring the light amount that reaches the threshold voltage. A center of gravity 301 indicates a position of the center of gravity of the four scanning laser beams, and a sub-scanning detection position is to be this position. Although a shift amount of the sub-scanning position is different from a position with a single beam of the laser beam 201, it is only necessary to detect an amount of change in the shift amount of the sub-scanning position, and because the amount of change of the position of the center of gravity 301 and the amount of change of the laser beam 201 are equal to each other, and therefore, the amount of change is detectable.

In an output waveform (solid line) of the light receiving unit shown at (c) in FIG. 5, there is a case affecting the time interval T. For example, in addition to degradation of reflectance of the optical device or transmittance (deterioration with time), when the rotation frequency of the polygon mirror deflector is reduced (the polygon mirror deflector rotate at 50% less rotation frequency when changed from 1200 dpi to 600 dpi) in response to a change in the pixel density at the time of image forming, an output waveform is to be as indicated by a dotted line. Because a falling time to fall to the threshold voltage determining an output of the comparator increases (the inclination becomes gentle), the time interval is to be a time interval Ts', and incorrect detection as that the shift amount of the sub-scanning position has changed can be done.

The falling time has correlation with an integration amount (integration light amount) of the light amount incident to the light receiving unit, and by controlling so that the integration light amount is fixed, the above problem can be solved.

Figure 10:
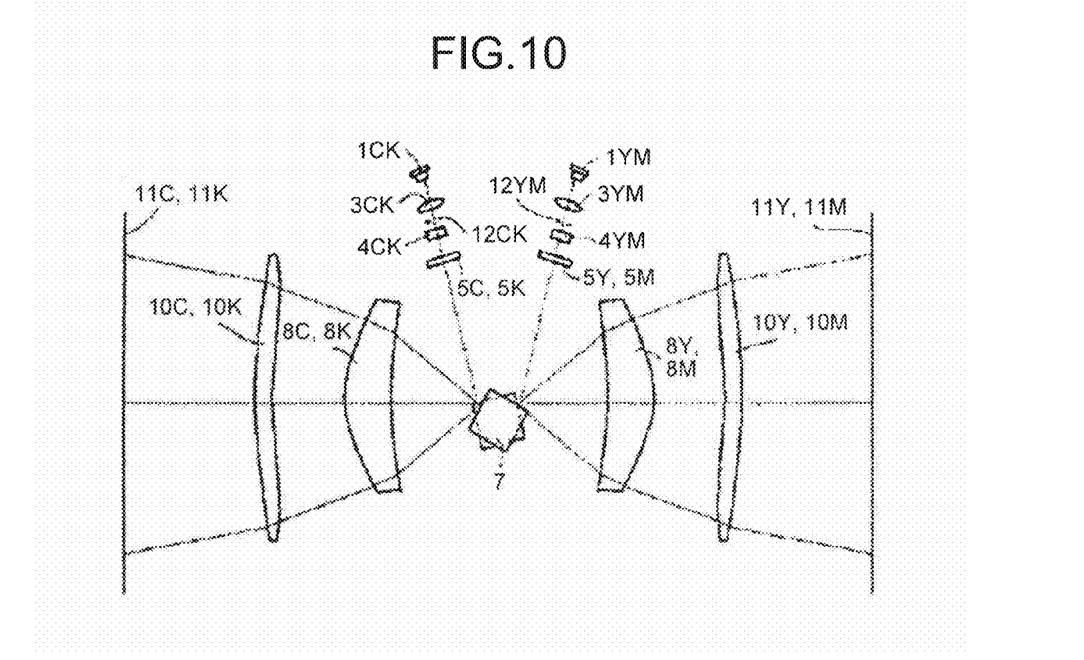
FIG. 10 is a schematic top view showing a configuration of the optical scanning device shown in FIG. 1 with a polygon mirror deflector 7 according to the first embodiment in a center.

FIG. 10 shows a tandem optical scanning device supporting four colors in which the optical scanning devices shown in FIG. 1 are arranged at positions opposing to each other sandwiching the polygon mirror deflector 7, and in which four scanned surfaces are scanned with laser beams. The figure illustrates a portion of an optical system optical scanning device viewed from a sub-scanning direction, that is, a direction of a rotation axis of the polygon mirror deflector 7. For simplicity of illustration, illustration of a mirror for bending an optical path on an optical path from the polygon mirror deflector 7 to an optical scanning position is omitted, and the optical path is illustrated straight.

Moreover, on a scanned surface, photoconductors 11Y, 11M, 11C, and 11K are arranged, and electrostatic latent images formed on these four photoconductors are visualized independently with magenta, yellow, cyan, and block toner, to form a color image.

A surface emitting laser 1YM and 1CK indicate semiconductor lasers, respectively. Each of these surface emitting lasers 1YM and 1CK of semiconductor lasers emits one beam of a laser beam. The half-surface emitting laser 1YM is intensity-modulated by an image signal corresponding to a yellow image and an image signal corresponding to a magenta image alternately.

A laser beam that is emitted from the surface emitting laser 1YM (although more than one laser beam is emitted actually, the laser beam is illustrated as one beam for simplicity's sake) is formed into a parallel flux by a coupling lens 3YM, shaped by passing through an aperture 12YM, and then enters a half mirror prism 4YM to be divided into two laser beams separated in the sub-scanning direction. The half mirror prism 4YM is one similar to the half mirror prism 4 explained with FIG. 2. One of the divided laser beams is used to write a yellow image and the other one is used to write a magenta image.

The two divided laser beams are collected to the sub-scanning direction by cylindrical lenses 5Y and 5M arranged in the sub-scanning direction (arranged so as to overlap with the sub-scanning direction), respectively, to enter to the polygon mirror deflector 7. In the cylindrical lenses 5Y and 5M, a piezoelectric actuator is arranged, and is controlled to correct banding according to a result of detecting a sub-scanning position shift of a laser beam and variation of the sub-scanning position of the photoconductor itself.

The polygon mirror deflector 7 is similar to one explained with FIG. 1 and FIG. 3, and has polygon mirrors with four deflection reflecting surfaces are layered in two layers in a direction of rotation axis, and unified into one unit in such a manner that deflection reflecting surfaces of the polygon mirrors are shifted from each other in a rotating direction. Line images that are long in the main scanning direction formed by the cylindrical lenses 5Y and 5M are formed near positions of the deflection reflecting surfaces of the respective polygons.

Laser beams deflected by the polygon mirror deflector 7 pass through first scanning lenses 8Y and 8M, and second scanning lenses 10Y and 10M, form optical spots on the photoconductors 11Y and 11M, which correspond to the optical scanning positions, by the action of these lenses, and these optical scanning positions are optically scanned with the laser beams.

Similarly, a laser beam that is emitted from the surface emitting laser 1CK is formed into a parallel flux by a coupling lens 3CK, shaped by passing through an aperture 12CK, and then enters a half mirror prism 4CK to be divided into two laser beams separated in the sub-scanning direction. The half mirror prism 4CK is one similar to the half mirror prism 4YM. The divided laser beams are used to write a cyan image and others are used to write a black image.

The two laser beams divided in the sub-scanning direction are collected to the sub-scanning direction by cylindrical lenses 5C and 5K arranged in the sub-scanning direction (arranged so as to overlap with the sub-scanning direction), respectively, to enter to the polygon mirror deflector 7. Subsequently, the divided laser beams pass through first scanning lenses 8C and 8K, and second scanning lenses 10C and 10K, form optical spots on the photoconductors 11C and 11K, which correspond to the optical scanning positions, by the action of these lenses, and these optical scanning positions are optically scanned with the divided laser beams.

(Image Forming Apparatus)

Figure 11:
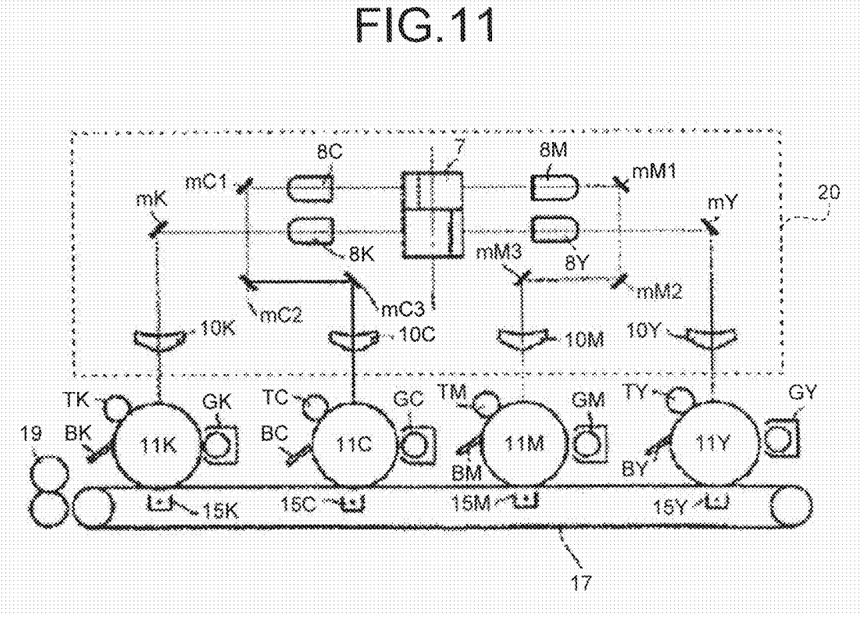
FIG. 11 is a schematic diagram showing a configuration of an image forming apparatus according to an embodiment of the present invention.

FIG. 11 shows a schematic configuration diagram of an image forming apparatus that includes an optical scanning device 20 according to the present invention described above, and that has a scanning-image-forming optical system for four colors (yellow, magenta, cyan, and black) for a color apparatus, and in which laser beams corresponding to the respective colors are collected on photoconductors.

One of laser beams deflected by the upper polygon mirror of the polygon mirror deflector 7 is guided to the photoconductor 11M that is a substantial optical scanning position from optical paths bent by optical-path bending mirrors mM1, mM2, and mM3. The other one is guided to the photoconductor 11C that is a substantial optical scanning position from optical paths bent by optical-path bending mirrors mC1, mC2, and mC3.

Furthermore, one of laser beams deflected by the lower polygon mirror of the polygon mirror deflector 7 is guided to the photoconductor 11Y that is a substantial optical scanning position from an optical path bent by an optical-path bending mirror mY. The other one is guided to the photoconductor 11K that is a substantial optical scanning position from an optical path bent by an optical-path bending mirror mK.

Therefore, laser beams from the two surface emitting lasers 1YM and 1CK are divided into two laser beams by the half mirror prisms 4YM and 4CK, respectively, to be laser beams corresponding to four colors. With these laser beams, the four photoconductors 11Y, 11M, 11C, and 11K are optically scanned. The photoconductors 11Y and 11M are optically scanned alternately with two laser beams obtained by dividing a laser beam from the surface emitting laser 1YM in the sub-scanning direction with rotation of the polygon mirror deflector 7, and the photoconductors 11C and 11K are optically scanned alternately with two laser beams obtained by dividing a laser beam from the surface emitting laser 1CK in the sub-scanning direction with rotation of the polygon mirror deflector 7.

All of the photoconductors 11Y to 11K are rotated clockwise at a regular speed, and charged uniformly by charging roller TY, TM, TC, and TK forming a charging unit, and are subjected to optical scanning by corresponding laser beams, and images of respective colors of yellow, magenta, cyan, and black are thereby written to form corresponding electrostatic latent images (negative latent images) thereon. As a component relating to the photoconductor in banding, variation in the sub-scanning positions of the photoconductor itself includes vibration propagated from a developing device or a cleaning blade, and rotation unevenness of a photoconductor driving axis (motor).

These electrostatic latent images are reverse developed by developing devices GY, GM, GC, and GK, respectively, and a yellow toner image, a magenta toner image, a cyan toner image, and a black toner image are formed on the photoconductors 11Y, 11M, 11C, and 11K, respectively.

These toner images of respective colors are transferred onto a transfer sheet not shown. Specifically, the transfer sheet is conveyed by a conveyance belt 17, a yellow toner image is transferred from the photoconductor 11Y by a transfer device 15Y thereon, and a magenta image, a cyan image, and a black image are sequentially transferred thereon from the photoconductors 11M, 11C, and 11K by transfer devices 15M, 15C, and 15K, respectively.

As described, the yellow toner image to the block toner image are superimposed on a transfer sheet to form a color image in a composite manner. This color image is fixed on the transfer sheet by a fixing device 19, thereby obtaining a color image.

As described above, according to the present invention, an optical scanning device, a method of adjusting an optical scanning device, and an image forming apparatus that enable a high image quality to be achieved and a stable image quality at low cost can be provided.

More specifically, according to the present invention, by performing light amount correction for each scanning line corresponding to variation of a sub-scanning position for banding in a small pitch of about 1 mm to several mm pitches in a cycle of a single rotation component of a polygon mirror, it is possible to reduce the banding from being recognized visually, and to achieve a high image quality. Furthermore, according to the present invention, by enabling easy identification of a surface of a polygon mirror at low cost, and association with a sub-scanning position, the effect described above can be achieved easily.

Moreover, according to the present invention, by performing light amount correction of each sub-scanning line according to a range (group) of a sub-scanning position in stages, simplification (reduction of bits of a digital/analog (D/A) converter) of an electric system and reduction in cost can be also achieved.

Furthermore, according to the present invention, by such an arrangement that light adjustment is not performed when a surface inclination of a polygon is small and banding is small, power consumption of the optical scanning device can be reduced.

Moreover, according to the present invention, even when rotation of a polygon mirror stops because a print job of image forming is finished, or the like, a sub-scanning position can be detected each time the device is restarted (a rotation synchronization signal is output), and the light amount adjustment can be appropriately maintained, and therefore, the effect described above can be stably achieved.

According to an embodiment, an optical scanning device that enables banding to be suppressed, and that achieves a high image quality and stabilizes an image quality at low cost can be provided.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:
1. An optical scanning device comprising:
a light source that emits a laser beam modulated and driven according to an image forming signal;

a scanning optical system that includes a polygon mirror to scan a surface of a photoconductor with the laser beam from the light source;

a surface identifying unit that associates a sub-scanning position by the polygon mirror with each surface of the polygon mirror;

a light-amount adjusting unit that adjusts a light amount of the light source according to the sub-scanning position for each surface of the polygon mirror;

a sub-scanning-position-group storage unit that stores a sub-scanning position for each surface of the polygon mirror as a sub-scanning position group in which sub-scanning positions of respective surfaces of the polygon mirror are grouped into a range of sub-scanning positions set in advance; and a counter that counts a number of the sub-scanning position groups for which grouping has been performed, wherein the light-amount adjusting unit adjusts a light amount of the light source according to the sub-scanning position group, and only when the number of the sub-scanning position groups is two or more, the light amount of the light source is adjusted by the light-source adjusting unit.

2. The optical scanning device according to claim 1, further comprising a storage unit that stores information about measurement of a sub-scanning position corresponding to each surface of the polygon mirror in advance, wherein the surface identifying unit calculates an adjustment amount for a light amount for each surface of the polygon mirror from the information, and a light amount of the light source is adjusted for each surface of the polygon mirror.

3. The optical scanning device according to claim 1, further comprising a photodetector that detects a scanning position of the laser beam, wherein the surface identifying unit identifies a sub-scanning position of each surface of the polygon mirror by associating a sub-scanning position detected by the photodetector and a main scanning time at each surface of the polygon mirror, and the light-amount adjusting unit calculates an adjustment amount for a light amount for each surface of the polygon mirror from information of the identified sub-scanning position.

4. The optical scanning device according to claim 3, wherein the surface identifying unit identifies a sub-scanning position of each surface of the polygon mirror, and the sub-scanning-position-group storage unit performs grouping, each time a rotation synchronization signal of the polygon mirror is detected by the photodetector.

5. An image forming apparatus that forms an image by forming an electrostatic latent image by scanning a photoconductor with light using an optical scanning unit, and by visualizing the electrostatic latent image, wherein the optical scanning unit is the optical scanning device according to claim 1.

6. A light-amount adjusting method of an optical scanning device that includes a light source emitting a laser beam modulated and driven according to an image forming signal, and a scanning optical system including a polygon mirror to scan a surface of a photoconductor with a laser beam from the light source, the method comprising:

associating a sub-scanning position by the polygon mirror with each surface of the polygon mirror;

adjusting a light amount of the light source according to the sub-scanning position for each surface of the polygon mirror;

storing a sub-scanning position for each surface of the polygon mirror as a sub-scanning position group in which sub-scanning positions of respective surfaces of the polygon mirror are grouped into a range of sub-scanning positions set in advance; and counting a number of the sub-scanning position groups for which grouping has been performed;

adjusting a light amount of the light source according to the sub-scanning position group; and adjusting the light amount of the light source only when the number of the sub-scanning position groups is two or more.

7. A light-amount adjusting method of an optical scanning device that includes a light source emitting a laser beam modulated and driven according to an image forming signal, and a scanning optical system including a polygon mirror to scan a surface of a photoconductor with a laser beam from the light source, the method comprising:

detecting sub-scanning positions by the polygon mirror;

associating the sub-scanning positions detected at the detecting with respective surfaces of the polygon mirror;

storing detected sub-scanning positions of the respective surfaces of the polygon mirror by grouping detected sub-scanning positions falling within predetermined position ranges into sub-scanning position groups; and adjusting a light amount of the light source for each surface of the polygon mirror according to the sub-scanning position groups.

* * * * *